United States Patent
Arazm et al.

(10) Patent No.: US 12,027,992 B2
(45) Date of Patent: Jul. 2, 2024

(54) MULTILEVEL ELECTRIC POWER CONVERTER

(71) Applicant: ECOLE DE TECHNOLOGIE SUPERIEURE, Montreal (CA)

(72) Inventors: Saeed Arazm, Quebec (CA); Kamal Al-Haddad, Montréal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 186 days.

(21) Appl. No.: 17/787,410

(22) PCT Filed: Dec. 21, 2020

(86) PCT No.: PCT/CA2020/051777
§ 371 (c)(1),
(2) Date: Jun. 20, 2022

(87) PCT Pub. No.: WO2021/119850
PCT Pub. Date: Jun. 24, 2021

(65) Prior Publication Data
US 2023/0024492 A1    Jan. 26, 2023

Related U.S. Application Data

(60) Provisional application No. 62/952,095, filed on Dec. 20, 2019.

(51) Int. Cl.
*H02M 7/483* (2007.01)
*H02M 7/5387* (2007.01)
*H02M 7/797* (2006.01)

(52) U.S. Cl.
CPC ....... *H02M 7/4835* (2021.05); *H02M 7/5387* (2013.01); *H02M 7/797* (2013.01)

(58) Field of Classification Search
CPC ... H02M 7/4835; H02M 7/5387; H02M 7/797
See application file for complete search history.

(56) References Cited

U.S. PATENT DOCUMENTS

| | | | | |
|---|---|---|---|---|
| 2011/0280052 A1* | 11/2011 | Al-Haddad | ........... | H02M 7/483 363/84 |
| 2016/0126862 A1* | 5/2016 | Vahedi | .................. | H02M 7/537 363/131 |
| 2021/0067057 A1* | 3/2021 | Abarzadeh | .......... | H02M 7/4837 |

FOREIGN PATENT DOCUMENTS

| | | |
|---|---|---|
| WO | 2019204935 | 10/2019 |
| WO | 2020047677 | 3/2020 |

* cited by examiner

*Primary Examiner* — Jue Zhang
(74) *Attorney, Agent, or Firm* — NORTON ROSE FULBRIGHT CANADA LLP

(57) ABSTRACT

A power converter for transforming electrical power between direct current power and alternating current power is provided, as well as related methods and systems. The power converter comprises: a half-bridge inverter, a switching cell, and a connection branch connecting the half-bridge inverter to the switching cell. The half-bridge inverter comprises: first and second switches connected in parallel, and a first capacitor connected between the first and second switches. The switching cell comprises: a first pair of switches forming a first branch, a second pair of switches and a second capacitor forming a second branch; and a third capacitor connected between the first and second branches. The connection branch is coupled to the half-bridge inverter at a first point intermediate the first capacitor and the second switch, and coupled to the switching cell at a second point intermediate the first branch and the second capacitor.

21 Claims, 9 Drawing Sheets

MULTILEVEL ELECTRIC POWER CONVERTER

CROSS-REFERENCE TO RELATED APPLICATIONS

The present application is a US National Stage of International Application No. PCT/CA2020/051777, filed on Dec. 21, 2020, which claims priority from U.S. Patent Application No. 62/952,095, filed on Dec. 20, 2019, the entire contents of which are incorporated herein by reference.

TECHNICAL FIELD

The present disclosure relates generally to the field of power electronic converters, and more particularly to multilevel voltage source converters.

BACKGROUND

Voltage source inverters (VSIs) have become a dominant power electronics converter in various industrial applications. VSIs are used in a number of applications, including multilevel converters, which can offer improved power quality and voltage stress reduction. In particular, modular multilevel converters (MMCs) have been used in industry due to ease of repair and maintenance, since damaged modules can easily be fixed or replaced.

A traditional MMC design is composed of multiple submodules, which can include two- or three-level converters, neutral-point-clamped (NPC) converters, and the like. However, many existing MMC designs are limited in their applicability, require components having high tolerances, or produce outputs which are of limited fidelity. In some cases, achieving higher quality output waveforms requires the number of submodules in the design to be increased. This in turn can result in higher power losses, lower reliability, higher complexity in voltage balancing, increased sensors and component complexity.

As a result, improvements are needed.

SUMMARY

In accordance with a broad aspect, there is provided a power converter for transforming electrical power between direct current (DC) power and alternating current (AC) power. The power converter comprises: a half-bridge inverter connectable via a first terminal, a switching cell connectable via a second terminal, and a connection branch connecting the half-bridge inverter to the switching cell. The half-bridge inverter comprises: first and second switches connected in parallel, and a first capacitor connected between the first and second switches. The switching cell comprises: a first pair of switches forming a first branch, a second pair of switches forming a second branch, the second branch comprising a second capacitor connected between the second pair of switches and the first branch; and a third capacitor connected between the first and second branches at connection points located between switches of the first and second pair of switches. The connection branch is coupled to the half-bridge inverter at a first point intermediate the first capacitor and the second switch, and coupled to the switching cell at a second point intermediate the first branch and the second capacitor.

In at least some embodiments, the power converter is operated as an inverter, is coupleable to a DC source via the first terminal, and is configured for producing an AC output at the second terminal.

In at least some embodiments, the first and second switches, the first pair of switches, and the second pair of switches are operated with at least one redundant switching state to produce the AC output, wherein the AC output has five voltage levels.

In at least some embodiments, the first and second switches, the first pair of switches, and the second pair of switches are operated without redundant switching states to produce the AC output, wherein the AC output has seven voltage levels.

In at least some embodiments, the power converter is operated as a rectifier, is coupleable to an AC source via the second terminal, and is configured for producing a DC output at the first terminal.

In at least some embodiments, the switching cell comprises first and second additional switches and an additional capacitor, the first additional switch connected in the first branch between the first pair of switches and the second terminal, the second additional switch connected in the second branch between the second pair of switches and the second terminal, and the additional capacitor connected between the first and second branches at a first subsequent connection point located between the first pair of switches and the first additional switch, and at a second subsequent connection point located between the second pair of switches and the second additional switch.

In at least some embodiments, the power converter is operated as an inverter, is coupleable to a DC source via the first terminal, and is configured for producing an AC output at the second terminal.

In at least some embodiments, the first and second switches, the first pair of switches, the second pair of switches, and the first and second additional switches are operated with at least one redundant switching state to produce the AC output, wherein the AC output has nine voltage levels.

In at least some embodiments, the first and second switches, the first pair of switches, the second pair of switches, and the first and second additional switches are operated without redundant switching states to produce the AC output, wherein the AC output has fifteen voltage levels.

In at least some embodiments, the power converter is operated as a rectifier, is coupleable to an AC source via the second terminal, and is configured for producing a DC output at the first terminal.

In at least some embodiments, the switching cell comprises at least one additional switching unit connected between the first and second pair of switch and the second terminal, each switching unit composed of first and second additional switches and an additional capacitor, the first additional switch connected in the first branch, the second additional switch connected in the second branch, and the additional capacitor connected between the first and second branches.

In at least some embodiments, the power converter is operated as an inverter, is coupleable to a DC source via the first terminal, and is configured for producing an AC output at the second terminal.

In at least some embodiments, the first and second switches, the first pair of switches, the second pair of switches, and the first and second additional switches of the at least one additional switching unit are operated with at least one redundant switching state to produce the AC output, wherein the AC output has (2n−1+1) voltage levels, where n is a total number of switching units.

In at least some embodiments, the first and second switches, the first pair of switches, the second pair of switches, and the first and second additional switches of the at least one additional switching unit are operated without redundant switching states to produce the AC output, wherein the AC output has (2n−1) voltage levels, where n is a total number of switching units.

In at least some embodiments, the power converter is operated as a rectifier, is coupleable to an AC source via the second terminal, and is configured for producing a DC output at the first terminal.

In accordance with another broad aspect, there is provided a three-phase power converter for transforming electrical power between direct current (DC) power and alternating current (AC) power. The three-phase power converter comprises first, second, and third power converters according to any one or more of the previous embodiments. The first, second, and third power converters are connected in parallel via the respective first terminals thereof.

In at least some embodiments, the first, second, and third power converters are connected via the respective second terminals thereof to respective first, second, and third common coupling points. The three-phase power converter comprises fourth, fifth, and sixth power converters according to any one of claims 1 to 15, the fourth, fifth, and sixth power converters being connected in parallel via the respective second terminals thereof, and being connected via the respective first terminals thereof to the first, second, and third common coupling points, respectively.

In accordance another broad aspect, there is provided a three-phase power inverter. The three-phase power inverter comprises first, second, and third power converters according to any one of the previous embodiments, the first, second, and third power converters being connected in parallel via the respective first terminals thereof and coupleable to a DC source thereby. The three-phase power inverter is configured for producing a three-phase AC output comprising a first phase output via the second terminal of the first power converter, a second phase output via the second terminal of the second power converter, and a third phase output via the second terminal of the third power converter.

In accordance another broad aspect, there is provided a three-phase power inverter, comprising first, second, third, fourth, fifth, and sixth power converters according to any one of the previous embodiments. The first, second, and third power converters are connected in parallel via the respective first terminals thereof and coupleable to a first terminal of a DC source thereby. The first, second, and third power converters are connected via the respective second terminals thereof to respective first, second, and third common coupling points. The fourth, fifth, and sixth power converters are connected in parallel via the respective second terminals thereof and coupleable to a second terminal of the DC source thereby. The fourth, fifth, and sixth power converters are connected via the respective first terminals thereof to the first, second, and third common coupling points, respectively.

In accordance another broad aspect, there is provided a three-phase power inverter, comprising first, second, third, fourth, fifth, and sixth arms, each of the arms comprising n power converters according to any one of claims 1, 6, and 11 that are connected in series, with a respective second terminal of each power converter in each of the arms connected to a respective first terminal of a subsequent power converter in each arm. The first, second, and third arms are connected in parallel via respective first terminals thereof and coupleable to a first terminal of a DC source. The first, second, and third arms are connected via respective second terminals thereof to respective first, second, and third common coupling points. The fourth, fifth, and sixth arms are connected in parallel via respective second terminals thereof and coupleable to a second terminal of the DC source. The fourth, fifth, and sixth arms are connected via respective first terminals thereof to the first, second, and third common coupling points.

In accordance another broad aspect, there is provided a power converter for transforming electrical power between direct current (DC) power and alternating current (AC) power. The power converter comprises a first branch having first, second and third switches and a diode; a second branch having fourth, fifth, sixth and seventh switches; and first, second and third flying capacitors. The first, second, and third flying capacitors connect the first and second branches. A positive terminal of the first flying capacitor is connected between the first switch and the diode of the first branch and a negative terminal of the first flying capacitor is connected between the fourth and fifth switches of the second branch. A negative terminal of the second flying capacitor is connected between the diode and the second switch of the first branch and a positive terminal of the second flying capacitor is connected between the fifth and sixth switches of the second branch. A negative terminal of the third flying capacitor is connected between the second and the third switches of the first branch and a positive terminal of the third flying capacitor is connected between the sixth and seventh switches of the second branch.

In accordance another broad aspect, there is provided a control system for a power converter. The control system comprises a pulse-width modulator configured for generating a plurality of voltage levels based on a modulation index, a modulating signal and a plurality of carrier waveforms; and a voltage balancer coupled to the pulse-width modulator and configured for producing control signals for the power converter based on the plurality of voltage levels.

In some embodiments, the pulse-width modulator is a phase-shift pulse-width modulator.

In some embodiments, the voltage balancer is coupleable to a plurality of capacitors of the power converter for monitoring stored charge values thereof, and wherein the control signals are based on the stored charge values.

In some embodiments, the control signals being based on the stored charge values comprises comparing the stored charge values to predetermined reference voltage values, and producing the control signals based on the result of the comparing.

In accordance another broad aspect, there is provided a for controlling a power converter. The method comprises: obtaining a modulation index, a reference voltage, and a plurality of carrier waveforms; generating a plurality of voltage levels based on the modulation index and the number of carrier waves; producing a plurality of control signals for the power converter based on the plurality of voltage levels; and issuing the control signals to a plurality of switches of the power converter.

In some embodiments, producing the plurality of control signals for the power converter is based on determining appropriate switching states for switches of the power converter by comparing measured voltage values of capacitors of the power converter to predetermined thresholds.

In some embodiments, producing the plurality of control signals comprises selecting the plurality of control signals to balance the voltage values of the capacitors of the power converter.

In accordance with at least some still further broad aspects, there is provided a generalized topology for multi-level converters and modular multilevel converters that requires fewer components and/or switching devices, suffers from reduced power losses, and provides more reliability than certain existing converters. Voltage balancing in the capacitors is performed concurrently with a modulation strategy without any control system. There is proposed an appropriate voltage balancing algorithm for the topology which, in certain embodiments, provides certain advantages over certain existing converters.

Features of the systems, devices, and methods described herein may be used in various combinations, in accordance with the embodiments described herein.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figures 1A, 1B:
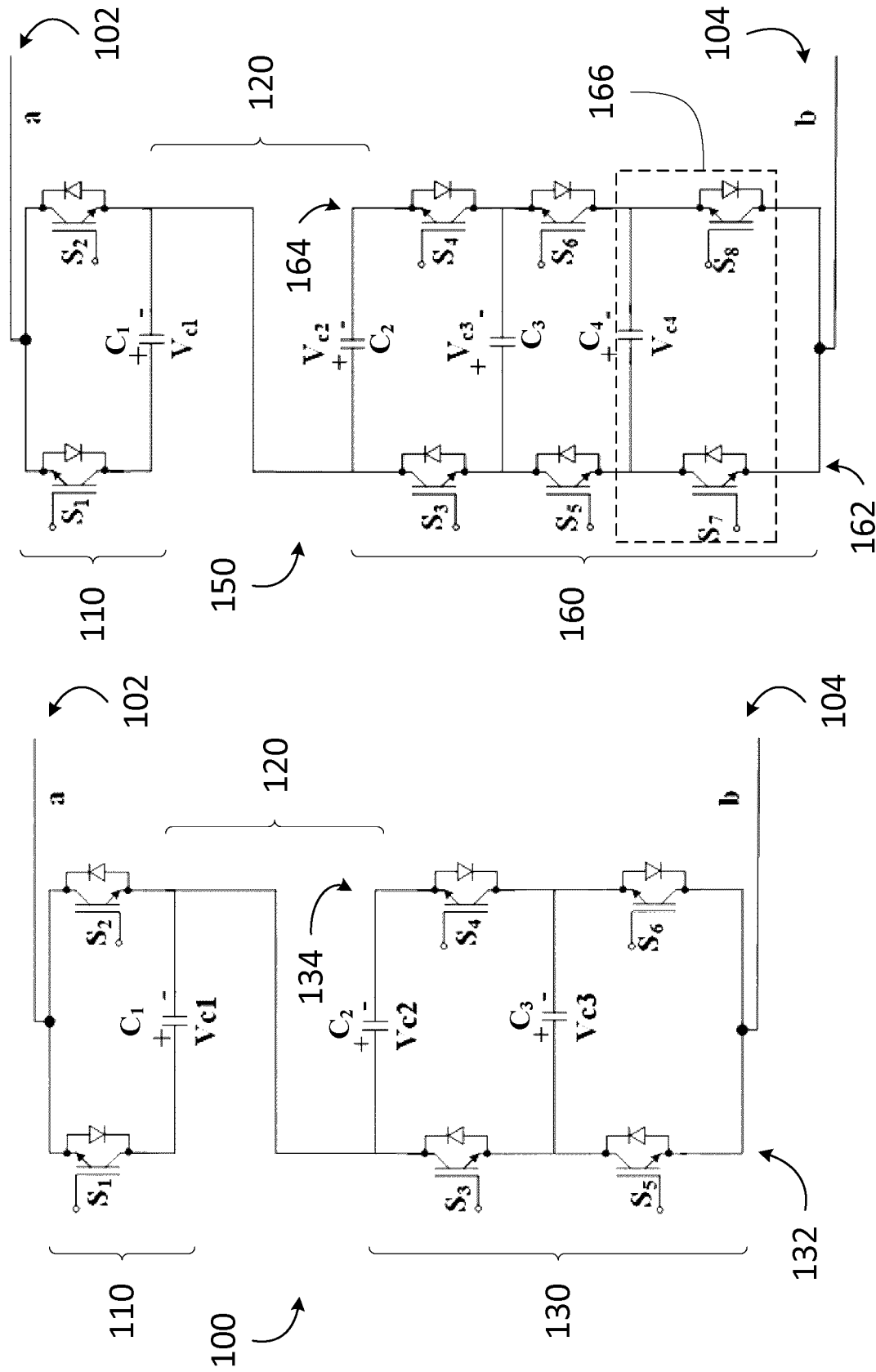
FIG. 1A illustrates an example Z-packed U-cell converter topology.
FIG. 1B illustrates an example expanded Z-packed U-cell converter topology.

With reference to FIG. 1, there is illustrated a voltage source inverter (VSI), termed a Z-packed U-cell converter (ZPUC) 100. The ZPUC 100 is connectable to other circuit elements via an input terminal 102 and an output terminal 104. It should be noted that, although the terms "input terminal" and "output terminal" are used for terminals 102, 104, the ZPUC 100 can be configured to permit the flow of current in any suitable fashion between terminals 102, 104. As will be described in greater detail hereinbelow, the ZPUC 100 can be used both as a rectifier and as an inverter, and has applications in a number of power converter configurations and systems. For example, the ZPUC 100 can be provided with a source of direct current (DC), and be used to produce an alternating current (AC). In another example, the ZPUC 100 is provided with an AC source, and produces a DC output.

The ZPUC 100 is composed of a half-bridge 110 and a switching cell 130 which are connected by a z-branch 120. The half-bridge 110 is connected between the input terminal 102 and the z-branch 120, and is composed of a pair of switches $S_1$ and $S_2$ and a capacitor $C_1$ coupled between the switches $S_1$, $S_2$. The input terminal 102 connects at a point intermediate the switches $S_1$, $S_2$, and the z-branch 120 connects at a point intermediate the capacitor $C_1$ and the switch $S_2$.

The switching cell 130 is composed of a pair of branches 132, 134 which both connect to the output terminal 104. The branch 132 is composed of switches $S_3$, $S_5$, and branch 134 is composed of a capacitor $C_2$ and switches $S_4$, $S_6$. A capacitor $C_3$ is connected between the branches 132, 134. The z-branch 120 connects at a point intermediate the switch $S_3$ and the capacitor $C_2$, i.e. where the branches 132, 134 connect. The output terminal 104 connects at a point intermediate the switches $S_5$, $S_6$, i.e. where the branches 132, 134 connect again.

It should be noted that although the z-branch 120 in FIG. 1A is shown as somewhat resembling a 'z' shape, the use of the term "z-branch" does not imply, and should not be interpreted as implying, that the particular physical connection between the half-bridge 110 and the switching cell 130 needs necessarily be 'z' shaped. Rather, any suitably-shaped connection between the half-bridge 110 and the switching cell 130 is considered, so long as connection couples the half-bridge 110 and the switching cell 130 as described hereinabove. The term "z-branch" is therefore used primarily for ease of reference, and not due to any implication of a particular shape for the z-branch 120.

Various modes of operation for the ZPUC 100 are considered. In some embodiments, the ZPUC 100 generates 5 different voltage levels with redundant switching states. When a load is placed across the terminals 102, 104, the 5 different voltage levels can be used to produce a 9-level waveform. In some other embodiments, the ZPUC 100 generates 7 different voltage levels using a more complex control approach, without redundant states.

In some embodiments, switches $S_1$, $S_2$ which compose the half-bridge inverter 110 have a switching frequency less than a switching frequency of switches $S_3$ to $S_6$ of the switching cell 130. For example, the switches $S_1$, $S_2$ operate at the fundamental frequency of the alternating current to be produced by or provided to the ZPUC 100 (e.g., 50 Hz, 60 Hz), and the switches $S_3$ to $S_6$ operate at a frequency several orders of magnitude above the fundamental frequency (e.g., 1 kHz or more). In some embodiments, a rated voltage value for switches $S_3$ to $S_6$ of the switching cell 130 is lower than a rated voltage value for switches $S_1$, $S_2$ which compose the half-bridge inverter 110. Other embodiments are also considered.

It should also be noted that the switching cell 130 is extensible. With additional reference to FIG. 1B, an alternative embodiment of the ZPUC 100 is illustrated at 150. The ZPUC 150 is provided with a switching cell 160 having branches 162, 164. The branches 162, 164 include additional switches $S_7$, $S_8$, and the switching cell 160 includes an additional capacitor $C_4$. The additional switches $S_7$, $S_8$ and capacitor $C_4$ form an additional switching unit 166 composing the switching cell 160, and enable the ZPUC 150 to generate additional voltage levels. For example, the ZPUC 150 can generate 9 different voltage levels with redundant switching states, or 15 voltage levels with no redundancy. If a further additional switching unit 166 is added to the ZPUC 150, 17 different voltage levels can be generated with redundant switching states, and 31 voltage levels with no redundancy.

Figure 2:
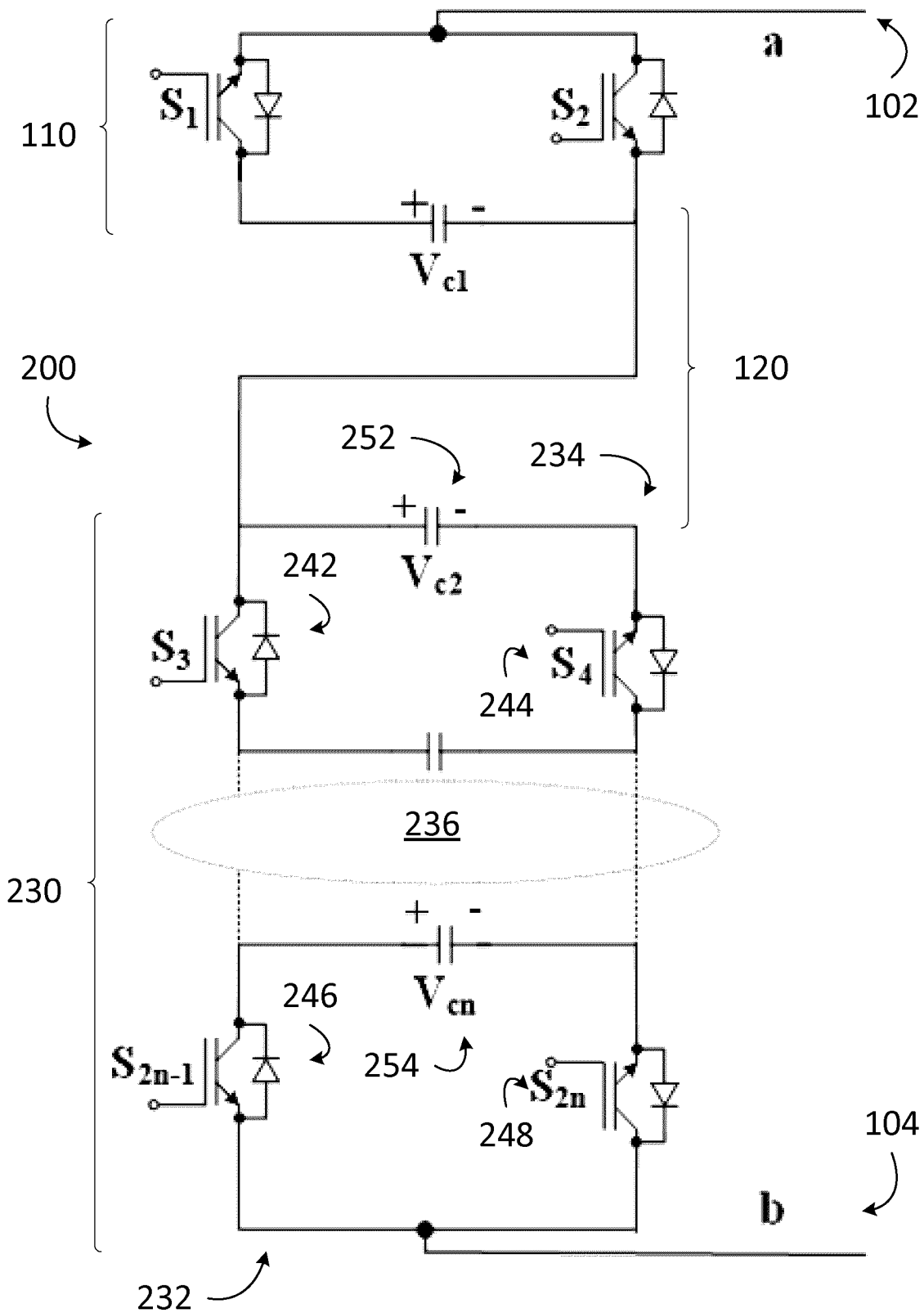
FIG. 2 illustrates an example generic Z-packed U-cell converter topology.

With additional reference to FIG. 2, a generic configuration of a ZPUC 200 is illustrated. The ZPUC 200 is composed of the half-bridge 110 and the z-branch 120 which connects the half-bridge 110 to a switching cell 230 having branches 232, 234. The switching cell 230 includes at minimum two sets of corresponding switches, illustrated here as switches 242, 244, and 246, 248, and two capacitors disposed between branches 232, 234, illustrated here as capacitors 252 and 254. The switching cell 230 additionally include any number of switching units 236, which, like the switching unit 166, are composed of a pair of switches and a capacitor connected between the branches 232, 234.

A version of the ZPUC 200 having no additional switching units 236 offers 8 distinct switching states, and thus can be used to produce 5 or 7 voltage levels, depending on the complexity of the switching control approach employed. Each additional switching unit 236 adds exponentially more switching states, and can thus be used to produce more voltage levels.

One potential benefit of the ZPUC 200 topology is reduced device count to generate an equivalent number of voltage levels vis-á-vis other existing VSIs. Table 1 hereinbelow shows a comparison among the number of devices necessary to produce five voltages levels in a three-phase system for several different types of VSIs.

TABLE 1

| INVERTER TYPE | DC SOURCE | FLYING CAPACITOR | CLAMPED DIODE | ACTIVE SWITCH | TOTAL COMPONENTS |
|---|---|---|---|---|---|
| CHB | 6 | 0 | 0 | 24 | 30 |
| NPC | 1 | 4 | 36 | 24 | 65 |
| H-NPC | 3 | 6 | 12 | 24 | 45 |
| FC | 1 | 9 | 0 | 24 | 34 |
| PUC5 | 3 | 3 | 0 | 18 | 24 |
| ZPUC5 | 1 | 9 | 0 | 18 | 28 |

Figure 3:
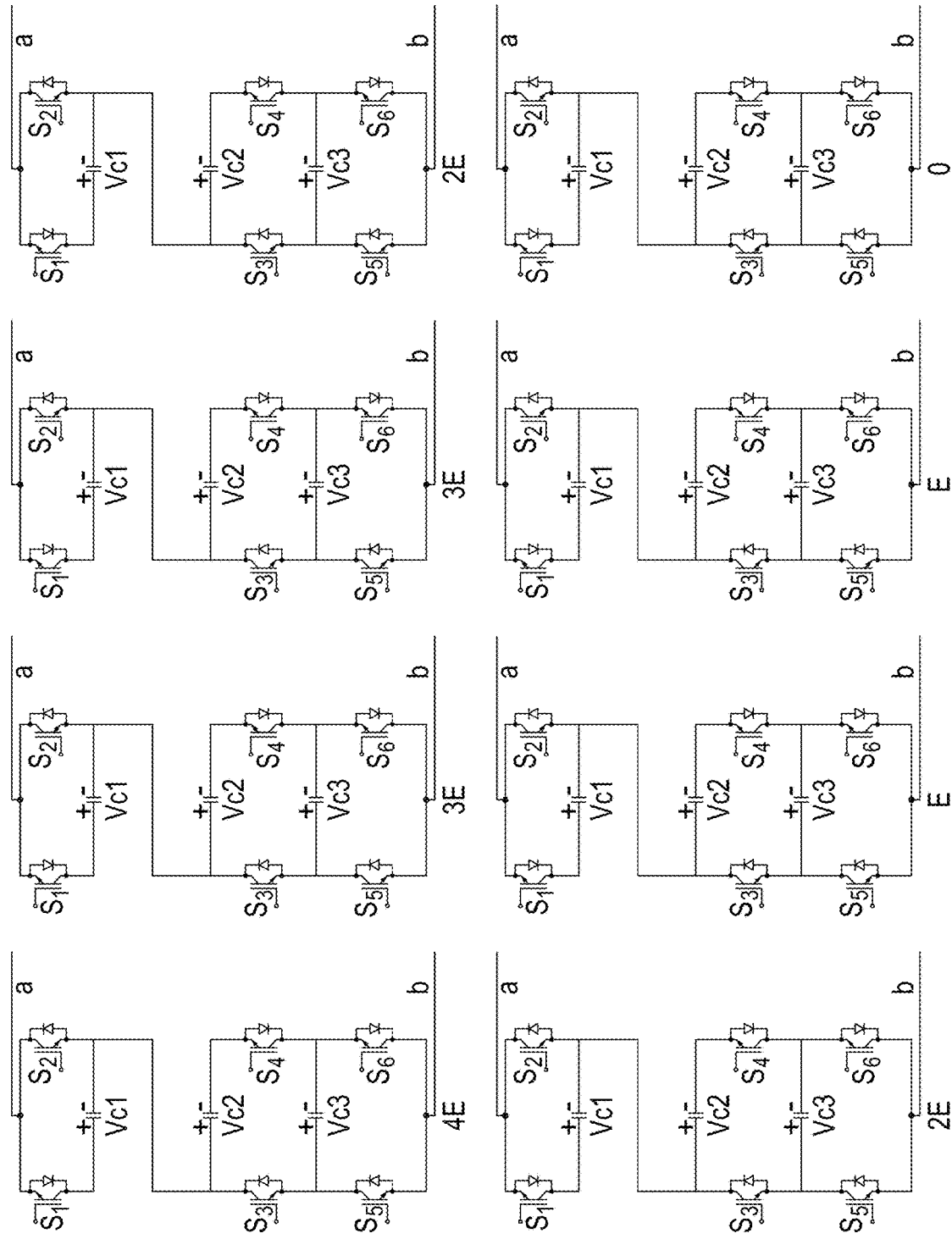
FIG. 3 illustrates various switching states and capacitor voltage states for the example Z-packed U-cell converter topology of FIG. 1A.

With reference to FIG. 3, various switching states and capacitor voltage sates for the ZPUC 100 of FIG. 1A are illustrated. The switching states are for an embodiment of the ZPUC 100 which is used to produce 5 distinct voltage levels. Portions of the ZPUC 100 which are not used to produce a particular state are faded, whereas portions of the ZPUC 100 which are used to produce a particular state are not faded. Put differently, the different faded and unfaded portions of the ZPUC 100 indicate the various conducting paths corresponding to the switching states used to produce different voltage levels, in accordance with at least one embodiment. For ease of understanding, different switching states are also presented in Table 2 hereinbelow. Control of the ZPUC 100 to produce 7 voltage levels depends on adjusting the voltage levels across the capacitors $C_1$, $C_2$, and $C_3$.

TABLE 2

| State | $S_1$ | $S_3$ | $S_5$ | $V_{AB}$ | $V_{AB\,(5L)}$ | $V_{AB\,(7L)}$ |
|---|---|---|---|---|---|---|
| 1 | 1 | 0 | 0 | $V_{C1} + V_{C2}$ | 4E | 6E |
| 2 | 1 | 0 | 1 | $V_{C1} + V_{C2} - V_{C3}$ | 3E | 5E |
| 3 | 1 | 1 | 0 | $V_{C1} + V_{C3}$ | 3E | 4E |
| 4 | 1 | 1 | 1 | $V_{C1}$ | 2E | 3E |
| 5 | 0 | 0 | 0 | $V_{C2}$ | 2E | 3E |

TABLE 2-continued

| State | $S_1$ | $S_3$ | $S_5$ | $V_{AB}$ | $V_{AB\,(5L)}$ | $V_{AB\,(7L)}$ |
|---|---|---|---|---|---|---|
| 6 | 0 | 0 | 1 | $V_{C2} - V_{C3}$ | E | 2E |
| 7 | 0 | 1 | 0 | $V_{C3}$ | E | E |
| 8 | 0 | 1 | 1 | 0 | 0 | 0 |

For the ZPUC 100, the voltage across the terminals 102, 104 ($V_{ab}$) can be expressed by the following equation:

$$V_{ab}=S_1 V_{C1}+(1-S_3)V_{C2}+(S_3-S_5)V_{C3} \quad (1)$$

where $V_{C1}$, $V_{C2}$, and $V_{C3}$ are the voltage values at capacitors $C_1$, $C_2$, $C_3$, and $S_1$, $S_3$, $S_5$ are the logical values for the switches $S_1$, $S_3$, $S_5$, which would be 1 when the switch is on, and 0 when the switch is off. Because of the positioning of the capacitors $C_1$, $C_2$, and $C_3$, the ZPUC 100 generates voltage levels at the output terminal 104 which range from 0 to 4E (or 6E, for the 7 voltage level control scheme). As will be discussed in greater detail hereinbelow, because the output voltage of the ZPUC 100 is strictly non-negative, the ZPUC 100 can be operated as part of three-phase converters and/or modular multilevel converters (MMCs).

In order to achieve 5 different voltage levels, the relationship between the capacitors is set out by the following relationship:

$$V_{C1}=V_{C2}=3V_{C3}=2E \quad (2);$$

and in order to achieve 7 different voltage levels, the relationship between the capacitors is set out by the following relationship:

$$V_{C1}=V_{C2}=2V_{C3}=3E \quad (3).$$

The equation (1) can be generalized for the ZPUC 200 of FIG. 2 by using the equation:

$$V_{ab}=S_1 V_{C1}+(1-S_3)V_{C2}+(S_3-S_5)V_{C3}+\ldots+(S_{2n-1}-S_2)V_{Cn} \quad (4)$$

where 'n' is the number of switching units 236 in the switching cell 230.

For the ZPUC 150 of FIG. 1B, different switching states are presented in Table 3 hereinbelow. Control of the ZPUC 100 to produce 9 or 15 voltage levels depends on adjusting the voltage levels across the capacitors $C_1$, $C_2$, $C_3$, and $C_4$.

TABLE 3

| State | $S_1$ | $S_3$ | $S_5$ | $V_7$ | $V_{AB}$ | $V_{AB-9L}$ | $V_{AB-15L}$ |
|---|---|---|---|---|---|---|---|
| 1 | 1 | 0 | 0 | 0 | $V_{C1} + V_{C2}$ | 8E | 14E |
| 2 | 1 | 0 | 0 | 1 | $V_{C1} + V_{C2} - V_{C4}$ | 7E | 13E |
| 3 | 1 | 0 | 1 | 0 | $V_{C1} + V_{C4} - V_{C3} + V_{C4}$ | 7E | 12E |
| 4 | 1 | 0 | 1 | 1 | $V_{C1} + V_{C4} - V_{C3}$ | 6E | 11E |
| 5 | 1 | 1 | 0 | 0 | $V_{C1} + V_{C3}$ | 6E | 10E |
| 6 | 1 | 1 | 0 | 1 | $V_{C1} + V_{C3} - V_{C4}$ | 5E | 9E |
| 7 | 1 | 1 | 1 | 0 | $V_{C1} + V_{C4}$ | 5E | 8E |
| 8 | 1 | 1 | 1 | 1 | $V_{C1}$ | 4E | 7E |
| 9 | 0 | 0 | 0 | 0 | $V_{C2}$ | 4E | 7E |
| 10 | 0 | 0 | 0 | 1 | $V_{C2} - V_{C4}$ | 3E | 6E |
| 11 | 0 | 0 | 1 | 0 | $V_{C2} - V_{C3} + V_{C4}$ | 3E | 5E |

TABLE 3-continued

| State | $S_1$ | $S_3$ | $S_5$ | $V_7$ | $V_{AB}$ | $V_{AB-9L}$ | $V_{AB-15L}$ |
|---|---|---|---|---|---|---|---|
| 12 | 0 | 0 | 1 | 1 | $V_{C2} - V_{C3}$ | 2E | 4E |
| 13 | 0 | 1 | 0 | 0 | $V_{C3}$ | 2E | 3E |
| 14 | 0 | 1 | 0 | 1 | $V_{C4} - V_{C4}$ | E | 2E |
| 15 | 0 | 1 | 1 | 0 | $V_{C4}$ | E | E |
| 16 | 0 | 1 | 1 | 1 | 0 | 0 | 0 |

In order to achieve 9 different voltage levels, the relationship between the capacitors is set out by the following relationship:

$$V_{C1} = V_{C2} = 2V_{C3} = 4V_{C4} \quad (5);$$

and in order to achieve 15 different voltage levels, the relationship between the capacitors is set out by the following relationship:

$$V_{C1} = V_{C2} = \frac{7}{3} V_{C3} = 7 V_{C4}. \quad (6)$$

Figure 4:
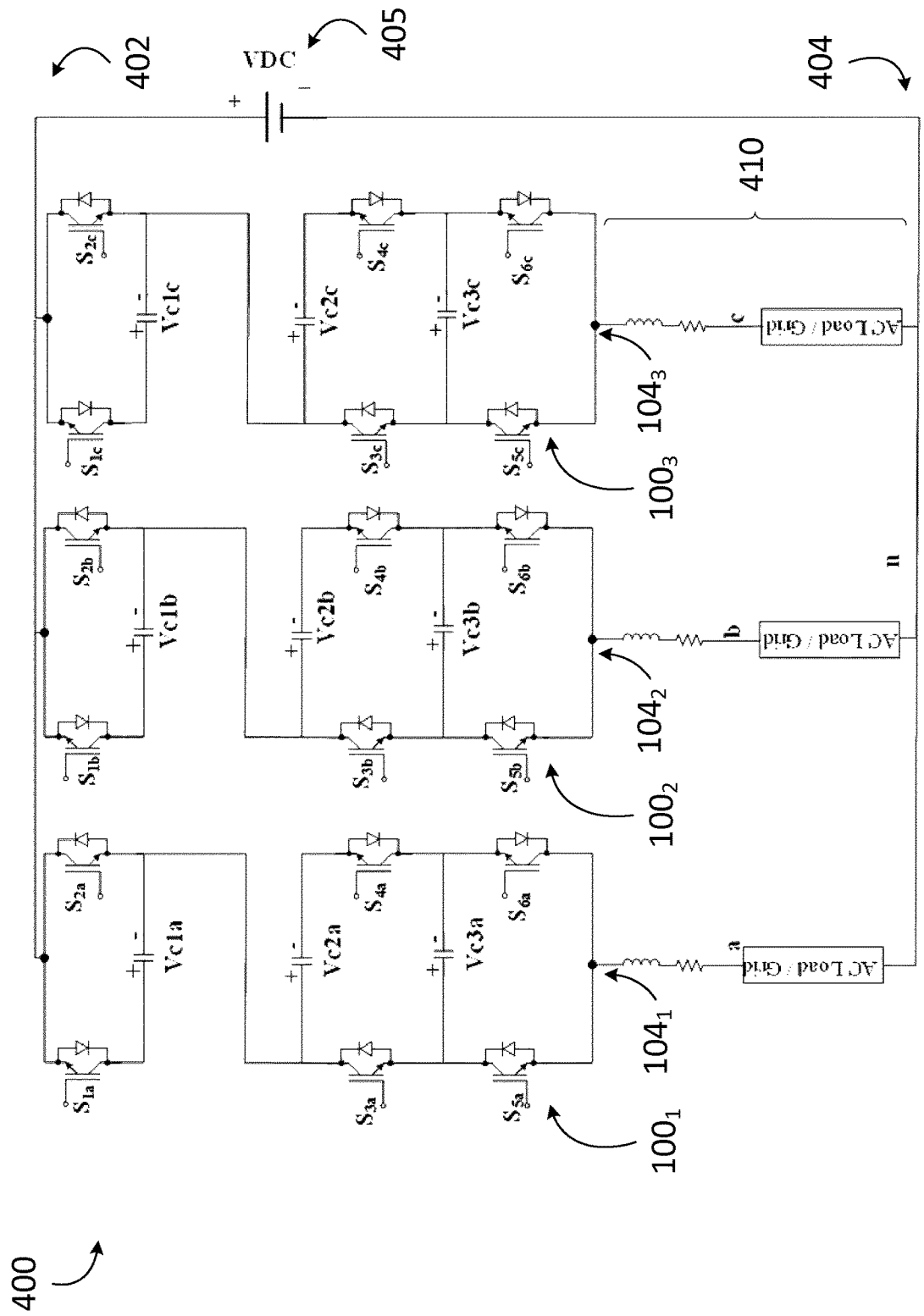
FIG. 4 illustrates an example three-phase Z-packed U-cell converter topology.

With reference to FIG. 4, a three-phase converter 400 for a load 410 is illustrated. The three-phase converter 400 employs three ZPUCs 100. For ease of understanding, the ZPUCs 100 used in the three-phase converter 400 are denoted $100_1$, $100_2$, and $100_3$. A DC source 405 is applied to the input terminal 402, which feeds the ZPUCs $100_1$, $100_2$, $100_3$ in three different phases. Each of the output ports $104_1$, $104_2$, $104_3$ of the ZPUCs $100_1$, $100_2$, $100_3$ is coupled to a different phase of a load 410. The output port 404 connects the load 410 to the DC source 405.

As illustrated in FIG. 4, the three-phase converter 400, based on the ZPUCs $100_1$, $100_2$, $100_3$, requires only a single DC source 405. The three-phase converter 400 can be employed in a variety of applications, including with static synchronous compensators (STATCOMs), or other applications where the load 410 is reactive. Table 4 hereinbelow illustrates the voltage levels across the phases of the load 410 for different switching states of the ZPUCs $100_1$, $100_2$, $100_3$.

TABLE 4

| State | $S_1$ | $S_3$ | $S_5$ | $V_{XN}$ | $V_{XN-5L}$ | $V_{XN-7L}$ |
|---|---|---|---|---|---|---|
| 1 | 1 | 0 | 0 | $V_{DC} - V_{C1} - V_{C2}$ | -2E | -3E |
| 2 | 1 | 0 | 1 | $V_{DC} - V_{C1} - V_{C2} + V_{C3}$ | -E | -2E |
| 3 | 1 | 1 | 0 | $V_{DC} - V_{C1} - V_{C3}$ | -E | -E |
| 4 | 1 | 1 | 1 | $V_{DC} - V_{C1}$ | 0 | 0 |
| 5 | 0 | 0 | 0 | $V_{DC} - V_{C2}$ | 0 | 0 |
| 6 | 0 | 0 | 1 | $V_{DC} - V_{C2} + V_{C3}$ | E | E |
| 7 | 0 | 1 | 0 | $V_{DC} - V_{C3}$ | E | 2E |
| 8 | 0 | 1 | 1 | $V_{DC}$ | 2E | 3E |

As presented in Table 4, the voltages across the load 410 do not have any offset, and instead range from −2E to 2E for the 5 voltage level control approach. As well, this configuration allows the capacitors $C_1$, $C_2$, $C_3$ of each of the ZPUCs $100_1$, $100_2$, $100_3$ to be charged and discharged so as to balance at desired values while minimizing ripples and offset. Also notable from Table 4, there are three pair redundant switching states to make voltage levels −E, 0, +E across the load 410. It should be pointed out that, just the capacitors which their voltage signs are different are affected and the other do not have any influence to balance the voltages. For instance, in states 2 and 3, a voltage value of −E is generated, and capacitor $C_1$ has no effect by changing the states and in both states its situation is constant. Instead, the capacitors $C_2$ and $C_3$ are charged or discharged depends on the current flow and switching states. Voltage balancing is discussed in Tables 5 and 6 hereinbelow.

Figure 5:
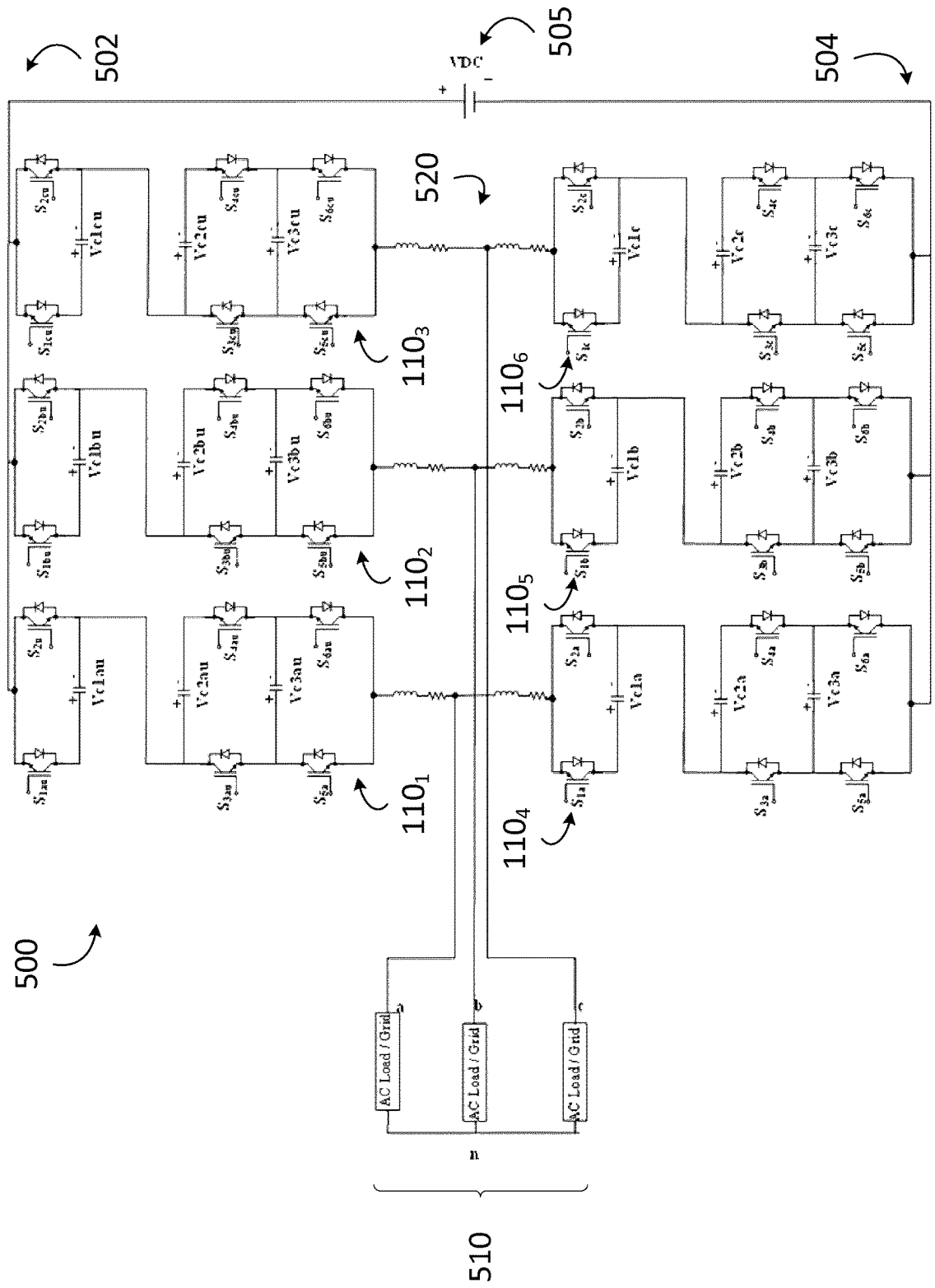
FIG. 5 illustrates an example three-phase Z-packed U-cell converter topology with parallel cells.

With reference to FIG. 5, an alternative a three-phase converter 500 for a load 510 is illustrated. The three-phase converter 500 employs six ZPUCs 100. For ease of understanding, the ZPUCs 100 used in the three-phase converter 500 are denoted $100_1$, $100_2$, $100_3$, $100_4$, $100_5$, and $100_6$. A DC source 505 is applied to the input terminal 502, which feeds the ZPUCs $100_1$, $100_2$, $100_3$ in parallel. Connection points 520 link the output ports of the ZPUCs $100_1$, $100_2$, $100_3$, the input ports of the ZPUCs $100_4$, $100_5$, $100_6$, and the three phases of the load 510. The output ports of the ZPUCs $100_4$, $100_5$, $100_6$ connect at output port 504 to the DC source 505. Each phase of the load 510 is coupled to a separate pair of ZPUCs 100. The ZPUC 100 topology provides output waveforms in both positive and negative levels for upper and lower arm cells of FIG. 5 so that voltage across the load is arranged from negative to positive voltage steps. This configuration can also be used in other arrangements, for instance in a three-phase MMC, as discussed hereinbelow in relation to FIG. 7.

The three-phase converter 500 can be used in a variety of applications, including motor drives, sources of renewable energy (e.g., for connecting with a broader grid), battery chargers, and for high-voltage direct current (HVDC). In some cases, multilevel converters which divide current between two parallel cells can make use of lower-rating current switching devices and produce lower power losses due to $RI^2$ formula. Thus, the three-phase converter 500 can offer twice the output voltage levels of the three-phase converter 400. It should be noted that in certain embodiments, the three-phase converter 400 and/or the three-phase converter 500 employ the ZPUC 150 of FIG. 1B instead of the ZPUC 100 of FIG. 1A, for instance to generate more voltage levels and to increase the quality of the output voltage.

Figure 6:
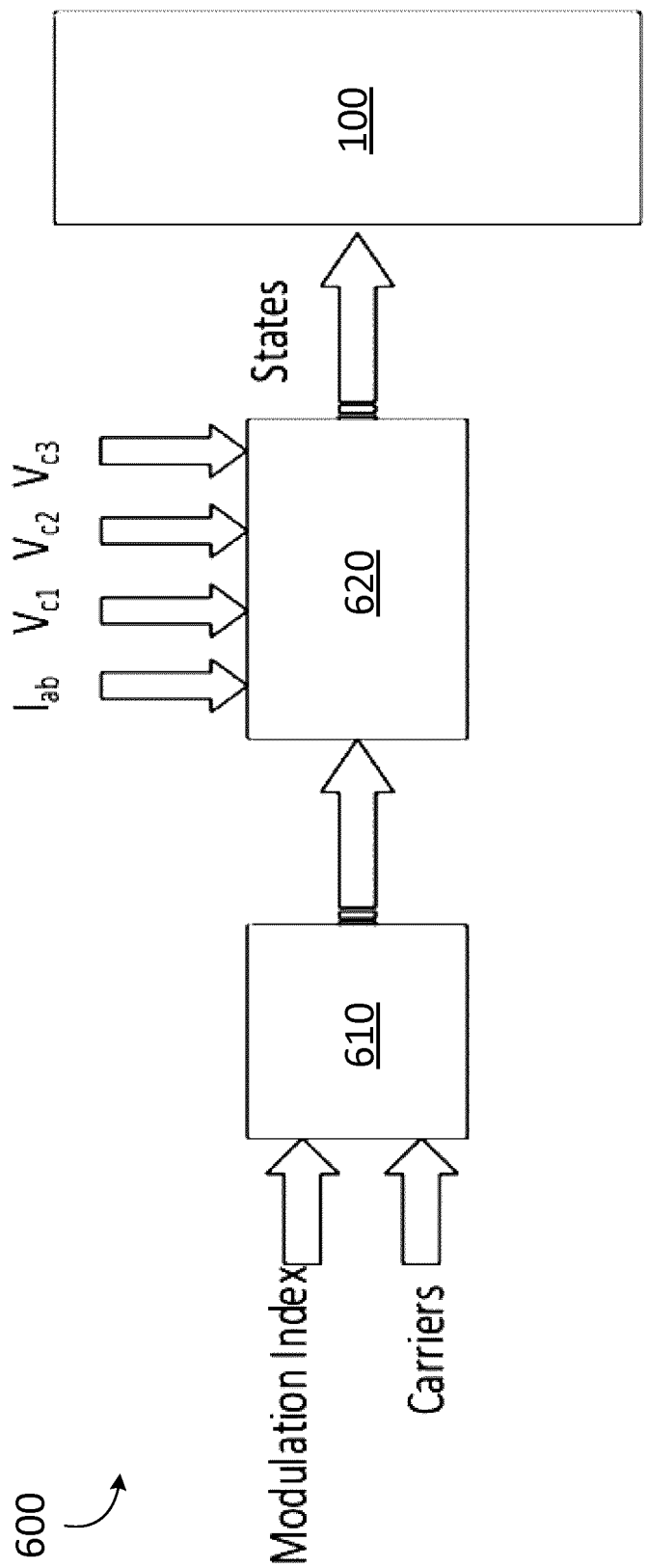
FIG. 6 illustrates a block diagram of a control system for the example Z-packed U-cell converter topology of FIG. 1.

With reference to FIG. 6, there is illustrated a control system 600 for controlling the ZPUC 100 of FIG. 1A. The control system 600 is composed of a Phase-Shift Pulse Width Modulator (PS-PWM) 610 and a voltage balancer 620. The PS-PWM 610 receives a modulation index and carrier waves and generates a plurality of voltage levels indicative of the voltages to be produced by the ZPUC 100. The voltage balancer 620 then uses the voltage levels provided by the PS-PWM 610 and implements an algorithm, detailed below in Table 5, to control the operation of the ZPUC 100, for instance by issuing control signals to the switches of the ZPUC 100. It should be noted that in some other embodiments, the PS-PWM 610 can be replaced by a simple PWM, or by a Left-Shift PWM (LS-PWM).

TABLE 5

| CONDITION | $I_{AB} > 0$ | $I_{AB} < 0$ | VOLTAGE LEVEL FROM MODULATION STRATEGY |
|---|---|---|---|
| NO CONDITION | STATE1 | STATE1 | 4E |
| Vc3 > 0.5 Vc2 | STATE2 | STATE3 | 3E |
| Vc3 < 0.5 Vc2 | STATE3 | STATE2 | 3E |
| Vc1 > vc2 | STATE5 | STATE4 | 2E |
| Vc1 < Vc2 | STATE4 | STATE5 | 2E |
| Vc3 > 0.5 Vc2 | STATE6 | STATE7 | E |
| Vc3 < 0.5 Vc2 | STATE7 | STATE6 | E |
| NO CONDITION | STATE8 | STATE8 | 0 |

The voltage balancer 620 operates based on a balance of stored charge the capacitors $C_1$, $C_2$, $C_3$ of the ZPUC 100. The voltage across each capacitor is measured and then is compared with predetermined reference voltage values. When a capacitor is above the reference voltage value, the capacitor is made to discharge. Conversely, when a capacitor is below the reference voltage value, the capacitor is made to charge.

With additional reference to FIG. 3, charging and discharging of the capacitors $C_1$, $C_2$, $C_3$ of the ZPUC 100 occurs in accordance with the different charging states presented in FIG. 3. Table 6 below indicates the state of each of the capacitors $C_1$, $C_2$, $C_3$ of the ZPUC 100 for each of the states illustrated in FIG. 3 (CH represents charging, DCH represents discharging, and no entry indicates no change in charge level):

TABLE 6

| State | $I_{AB} > 0$ | | | $I_{AB} < 0$ | | |
|---|---|---|---|---|---|---|
|  | $C_1$ | $C_3$ | $C_2$ | $C_1$ | $C_3$ | $C_2$ |
| 1 | CH | — | CH | DCH | — | DCH |
| 2 | CH | DCH | CH | DCH | CH | DCH |
| 3 | CH | CH | — | DCH | DCH | — |
| 4 | CH | — | — | DCH | — | — |
| 5 | — | — | CH | — | — | DCH |
| 6 | — | DCH | CH | — | CH | DCH |
| 7 | — | CH | — | — | DCH | — |
| 8 | — | — | — | — | — | — |

Figure 7:
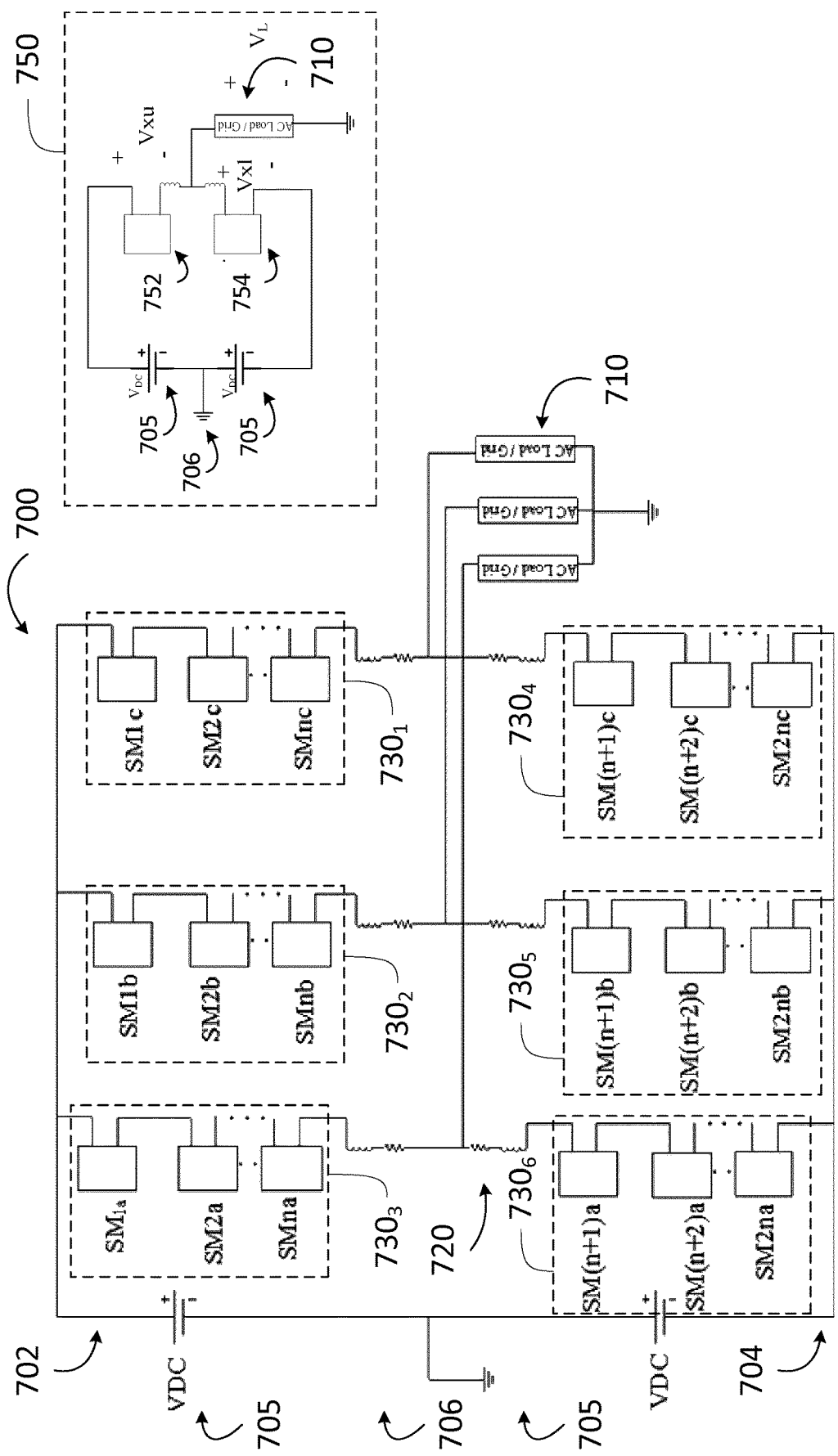
FIG. 7 illustrates an example modular multilevel converter (MMC) topology using the Z-packed U-cell converter topology of FIG. 1A.

With reference to FIG. 7, there is illustrated a three-phase MMC 700 making use of multiple ZPUCs 100. The three-phase MMC 700 is composed of a plurality of arms, labelled here as $730_1$, $730_2$, $730_3$, $730_4$, $730_5$, and $730_6$. The arms $730_1$ and $730_4$, $730_2$ and $730_5$, and $730_3$ and $730_6$ are each associated with a respective phase of the three-phase MMC 700. A first DC source 705 is connected to arms $730_1$, $730_2$, and $730_3$ at input terminal 702, and a second DC source 705 is connected to arms $730_4$, $730_5$, and $730_6$ at output terminal 704. A ground 706 is connected between the DC sources 705.

Each of the arms $730_1$, $730_2$, $730_3$, $730_4$, $730_5$, and $730_6$ is composed of one or more ZPUCs, which can be the ZPUC 100, the ZPUC 150, and/or the ZPUC 200, as appropriate. For instance, all arms $730_1$, $730_2$, $730_3$, $730_4$, $730_5$, and $730_6$ can make use of the same type of ZPUC. In some other cases, some arms $730_1$, $730_2$, $730_3$, $730_4$, $730_5$, and $730_6$ use different ZPUCs than other arms. Other configurations are also considered.

The arms $730_1$ and $730_4$, $730_2$ and $730_5$, as well as $730_3$ and $730_6$ are connected to one-another at connection points 720, where the three-phase load 710 is also connected. One phase of the load 710 is connected to each of the branches of the three-phase MMC 700. A single-line diagram of MMC 700 is illustrated at 750, with block 752 representing the arms $730_1$, $730_2$, and $730_3$, and with block 754 representing the ZPUCs $730_4$, $730_5$, and $730_6$.

The voltage across the load 710, denoted $V_L$, can be obtained by performing Kirchhoff's voltage law for the blocks 752 and 754:

$$V_{xu} = V_{DC} - V_L \quad (7)$$

$$V_{xl} = V_{DC} + V_L \quad (8)$$

$$V_L = \frac{V_{xl} - V_{xu}}{2} \quad (9)$$

If each of the arms $730_1$, $730_2$, $730_3$, $730_4$, $730_5$, and $730_6$ has n ZPUC 200, the voltages $V_{xu}$ and $V_{xl}$ are produced in 4n+1 levels, namely 0 to 4nE. As a result, the voltage $V_L$ across the load 710 would vary from −2nE to 2nE in steps 1/2 E, and as a result the voltage levels at the output to the load 710 is equal to 8n+1, since the voltage in block 752 is out of phase vis-á-vis the voltage in block 754. From equation (9), it can be seen that the voltage across the load 710 can be equivalent to double the voltage across either one of the block 752, 754, if the voltage across the block 752 is negative.

Table 5 hereinabove lists the switching states for each of the ZPUCs 200 in arms $730_1$, $730_2$, $730_3$, $730_4$, $730_5$, and $730_6$ when used as part of the three-phase MMC 700.

In general, the total stored energy $E_{C_i}$ in the capacitors of any one of the ZPUCs 200 can be expressed by $$E_{ci} = \sum_{j=1}^{3} V_{cij}^2 \quad (10)$$

$$I = \text{sort}(E_{ci})$$

where $V_{C_{ij}}$ is the voltage of the capacitors $C_1$, $C_2$, $C_3$ of each individual one of the ZPUCs 200. The controller of the three-phase MMC 700 can sort the voltage levels of the capacitors for each of the ZPUCs $100_i$, in arms $730_1$, $730_2$, $730_3$, $730_4$, $730_5$, and $730_6$ for control purposes.

To generate the maximum voltage level 4n+1 for the three-phase MMC 700, the ZPUCs 200 in arms $730_1$, $730_2$, $730_3$, $730_4$, $730_5$, and $730_6$ are operated in "state 1", as defined in Table 5 hereinabove. Then to generate level 4n, the module corresponding to the first array (i.e., j=1) in equation (10) should be selected to operate in one of state 2 or 3 of Table 5, in order to discharge the related capacitor. The algorithm described in Table 5 should be used for selection between mentioned states. In other words, at least one of the ZPUCs 200 in arms $730_1$, $730_2$, $730_3$, $730_4$, $730_5$, and $730_6$ is selected to operate in one of state 2 3, to discharge associated capacitors.

Figure 8:
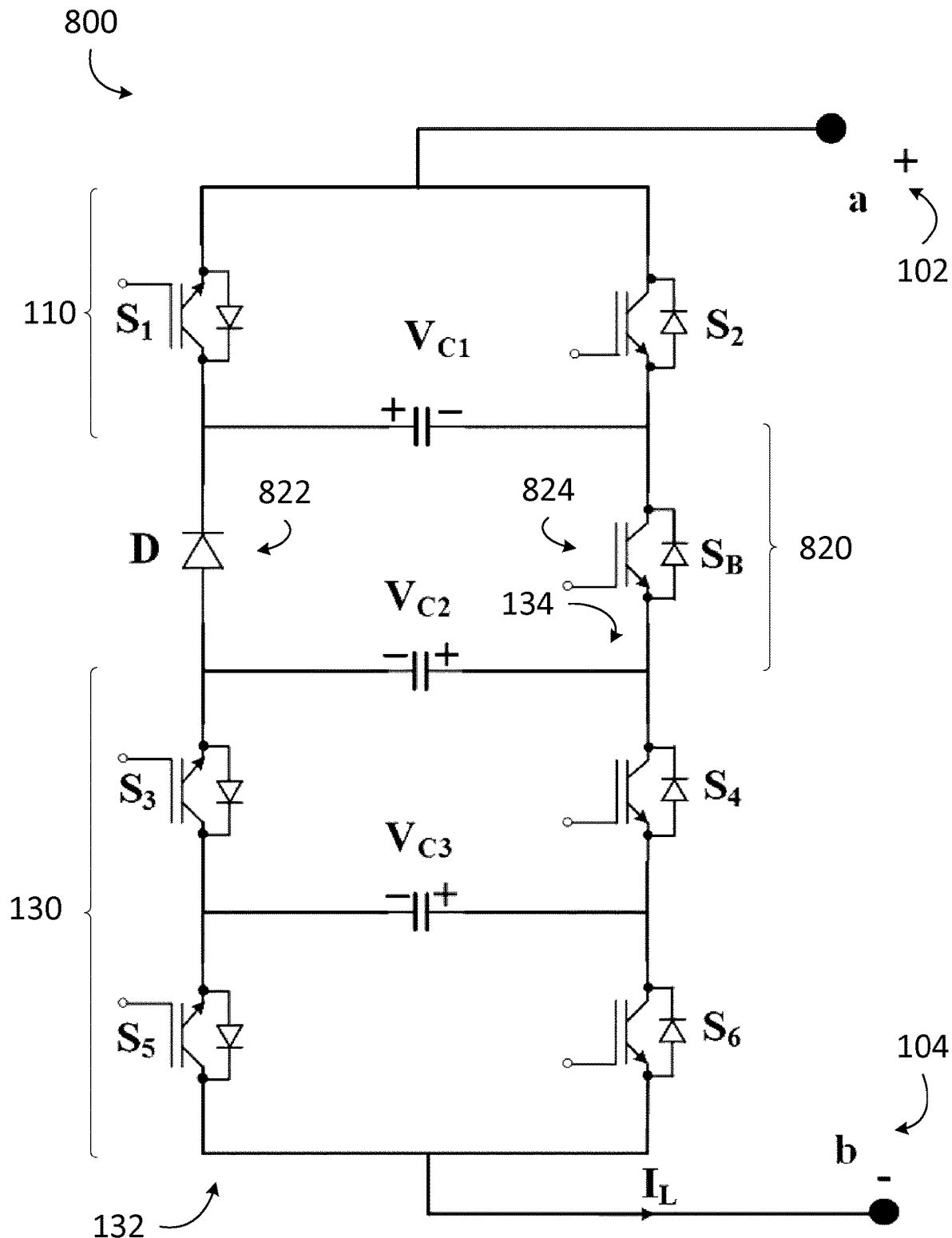
FIG. 8 illustrates an example modified Z-packed U-cell converter topology of FIG. 1A.

With reference to FIG. 8, an alternative embodiment of the ZPUC 100 of FIG. 1A is illustrated, identified as ZPUC 800. In the ZPUC 800, the z-branch 120 is replaced with a connection 820 which the half-bridge inverter 110 to the switching cell 130. The connection 820 includes a diode 822, which connects the switch $S_1$ of the half-bridge inverter 110 to the branch 132, and a switch 824, which connects the switch $S_2$ of the half-bridge inverter 100 to the branch 134. The ZPUC 800 can be used to pass the DC fault current without requiring an additional DC circuit breaker.

TABLE 7

| State | $S_1$ | $S_3$ | $S_5$ | $S_B$ | $V_{AB}$ | $V_{AB\text{-}BALANCED}$ |
|---|---|---|---|---|---|---|
| 1 | 1 | 1 | 1 | 1 | $V_{C1} + V_{C2}$ | 4E |
| 2 | 1 | 0 | 1 | 1 | $V_{C1} + V_{C2} - V_{C3}$ | 3E |
| 3 | 1 | 1 | 0 | 1 | $V_{C1} + V_{C3}$ | 3E |
| 4 | 1 | 0 | 0 | 1 | $V_{C1}$ | 2E |
| 5 | 0 | 1 | 1 | 1 | $V_{C2}$ | 2E |
| 6 | 0 | 0 | 1 | 1 | $V_{C2} - V_{C3}$ | E |
| 7 | 0 | 1 | 0 | 1 | $V_{C3}$ | E |
| 8 | 0 | 0 | 0 | 1 | 0 | 0 |
| BLOCKING STATE | 0 | 1 | 1 | 0 | — | — |

The connector 820 can serve to block DC fault current flow in certain switching states when providing current from a DC source coupled to the input terminal 102 toward a load coupled to the output terminal 104. In operation, the switch 824 is continually in the "on" state when providing power to the output terminal 104. When fault current flows from a short-circuited point toward the input terminal 102, and thus toward a DC source, the switch 824 is switched "off", and the diode 822 blocks any current from flowing toward the DC source. As a result, no external circuit breaker is needed to make use of the ZPUC 800. Table. 7 shows the switching states for ZPUC 800.

Figure 9A:
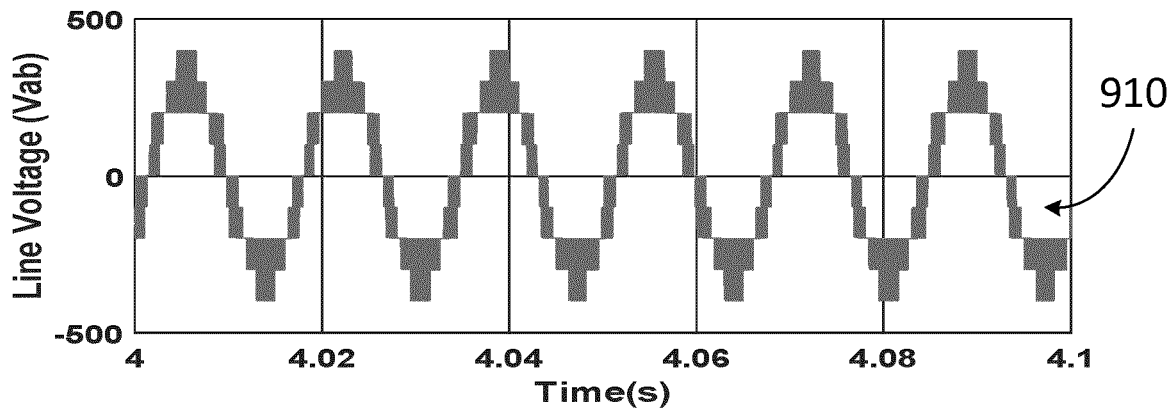
FIG. 9A-C illustrate example simulation results for outputs of the Z-packed U-cell converter topology of FIG. 1A and for the MMC of FIG. 7.
Figure 9B:
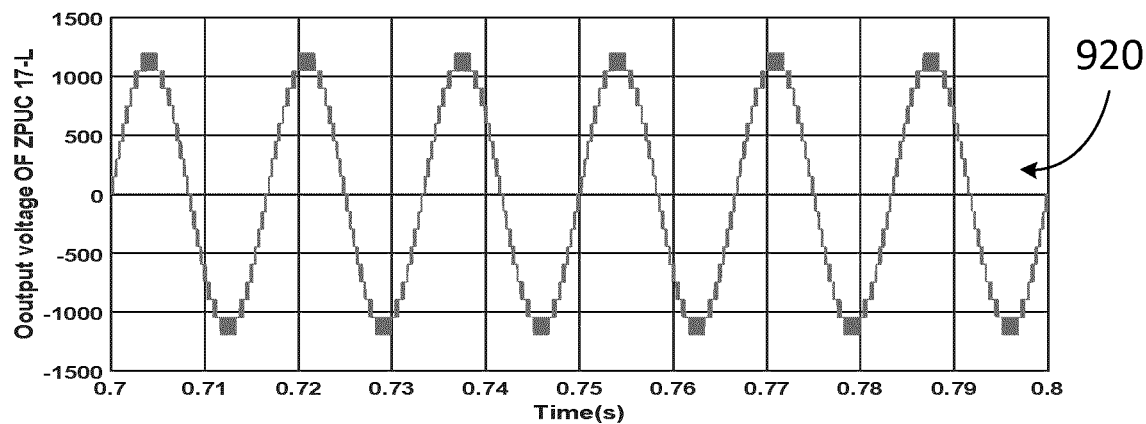
Figure 9C:
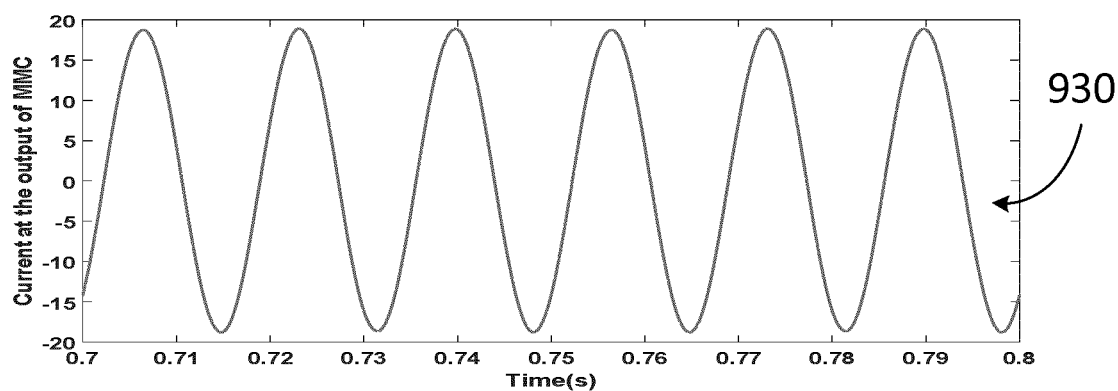

With reference to FIGS. 9A-C, simulation results for the three-phase converter 400 and for the three-phase MMC 700 are illustrated. In FIG. 9A, the line voltage 910 across the load 410 coupled to the three-phase converter 400 is illustrated. As can be seen, the line voltage 910 substantially resembles an AC signal.

In FIG. 9B, the output voltage 920 of one of the ZPUCs 100 in the three-phase MMC 700 is illustrated. In FIG. 9C, the output current 930 to the load 710 of the three-phase MMC 700 is illustrated. As can be seen, both the output voltage 920 and the output current 930 demonstrate characteristics that are consistent with AC signals.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A power converter for transforming electrical power between direct current (DC) power and alternating current (AC) power, comprising:
   a half-bridge inverter connectable via a first terminal, comprising:
      first and second switches connected in parallel; and
      a first capacitor connected between the first and second switches;
   a switching cell connectable via a second terminal, comprising:
      a first pair of switches forming a first branch;
      a second pair of switches forming a second branch, the second branch comprising a second capacitor connected between the second pair of switches and the first branch; and
      a third capacitor connected between the first and second branches at connection points located between switches of the first and second pair of switches; and
   a connection branch connecting the half-bridge inverter to the switching cell, the connection branch coupled to the half-bridge inverter at a first point intermediate the first capacitor and the second switch, and coupled to the switching cell at a second point intermediate the first branch and the second capacitor.

2. The power converter of claim 1, wherein the power converter is operated as an inverter, is coupleable to a DC source via the first terminal, and is configured for producing an AC output at the second terminal.

3. The power converter of claim 2, wherein the first and second switches, the first pair of switches, and the second pair of switches are operated with at least one redundant switching state to produce the AC output, wherein the AC output has five voltage levels.

4. The power converter of claim 2, wherein the first and second switches, the first pair of switches, and the second pair of switches are operated without redundant switching states to produce the AC output, wherein the AC output has seven voltage levels.

5. The power converter of claim 1, wherein the power converter is operated as a rectifier, is coupleable to an AC source via the second terminal, and is configured for producing a DC output at the first terminal.

6. The power converter of claim 1, wherein the switching cell comprises first and second additional switches and an additional capacitor, the first additional switch connected in the first branch between the first pair of switches and the second terminal, the second additional switch connected in the second branch between the second pair of switches and the second terminal, and the additional capacitor connected between the first and second branches at a first subsequent connection point located between the first pair of switches and the first additional switch, and at a second subsequent connection point located between the second pair of switches and the second additional switch.

7. The power converter of claim 6, wherein the power converter is operated as an inverter, is coupleable to a DC source via the first terminal, and is configured for producing an AC output at the second terminal.

8. The power converter of claim 7, wherein the first and second switches, the first pair of switches, the second pair of switches, and the first and second additional switches are operated with at least one redundant switching state to produce the AC output, wherein the AC output has nine voltage levels.

9. The power converter of claim 7, wherein the first and second switches, the first pair of switches, the second pair of switches, and the first and second additional switches are operated without redundant switching states to produce the AC output, wherein the AC output has fifteen voltage levels.

10. The power converter of claim 6, wherein the power converter is operated as a rectifier, is coupleable to an AC source via the second terminal, and is configured for producing a DC output at the first terminal.

11. The power converter of claim 1, wherein the switching cell comprises at least one additional switching unit connected between the first and second pair of switch and the second terminal, each switching unit composed of first and second additional switches and an additional capacitor, the first additional switch connected in the first branch, the second additional switch connected in the second branch, and the additional capacitor connected between the first and second branches.

12. The power converter of claim 11, wherein the power converter is operated as an inverter, is coupleable to a DC source via the first terminal, and is configured for producing an AC output at the second terminal.

13. The power converter of claim 12, wherein the first and second switches, the first pair of switches, the second pair of switches, and the first and second additional switches of the at least one additional switching unit are operated with at least one redundant switching state to produce the AC output, wherein the AC output has ($2^{n-1}+1$) voltage levels, where n is a total number of switching units.

14. The power converter of claim 12, wherein the first and second switches, the first pair of switches, the second pair of switches, and the first and second additional switches of the at least one additional switching unit are operated without redundant switching states to produce the AC output, wherein the AC output has (2n−1) voltage levels, where n is a total number of switching units.

15. The power converter of claim 11, wherein the power converter is operated as a rectifier, is coupleable to an AC source via the second terminal, and is configured for producing a DC output at the first terminal.

16. A three-phase power converter for transforming electrical power between direct current (DC) power and alternating current (AC) power, comprising first, second, and third power converters according to claim 1, the first, second, and third power converters being connected in parallel via the respective first terminals thereof.

17. The three-phase power converter of claim 16, wherein the first, second, and third power converters are connected via the respective second terminals thereof to respective first, second, and third common coupling points, the three-phase power converter comprising fourth, fifth, and sixth power converters according to claim 1, the fourth, fifth, and sixth power converters being connected in parallel via the respective second terminals thereof, and being connected via the respective first terminals thereof to the first, second, and third common coupling points, respectively.

18. A three-phase power inverter, comprising first, second, and third power converters according to claim 1, the first, second, and third power converters being connected in parallel via the respective first terminals thereof and coupleable to a DC source thereby, wherein the three-phase power inverter is configured for producing a three-phase AC output comprising a first phase output via the second terminal of the first power converter, a second phase output via the second terminal of the second power converter, and a third phase output via the second terminal of the third power converter.

19. A three-phase power inverter, comprising first, second, third, fourth, fifth, and sixth power converters according to claim 1, wherein the first, second, and third power converters are connected in parallel via the respective first terminals thereof and coupleable to a first terminal of a DC source thereby, and wherein the first, second, and third power converters are connected via the respective second terminals thereof to respective first, second, and third common coupling points, wherein the fourth, fifth, and sixth power converters are connected in parallel via the respective second terminals thereof and coupleable to a second terminal of the DC source thereby, and wherein the fourth, fifth, and sixth power converters are connected via the respective first terminals thereof to the first, second, and third common coupling points, respectively.

20. A three-phase power inverter, comprising first, second, third, fourth, fifth, and sixth arms, each of the arms comprising n power converters according to claim 1 that are connected in series, with a respective second terminal of each power converter in each of the arms connected to a respective first terminal of a subsequent power converter in each arm, wherein the first, second, and third arms are connected in parallel via respective first terminals thereof and coupleable to a first terminal of a DC source, and wherein the first, second, and third arms are connected via respective second terminals thereof to respective first, second, and third common coupling points, wherein the fourth, fifth, and sixth arms are connected in parallel via respective second terminals thereof and coupleable to a second terminal of the DC source, and wherein the fourth, fifth, and sixth arms are connected via respective first terminals thereof to the first, second, and third common coupling points.

21. A power converter for transforming electrical power between direct current (DC) power and alternating current (AC) power, comprising:
   a first branch having first, second and third switches and a diode;
   a second branch having fourth, fifth, sixth and seventh switches; and
   first, second and third flying capacitors connecting the first and second branches wherein a positive terminal of the first flying capacitor is connected between the first switch and the diode of the first branch and a negative terminal of the first flying capacitor is connected between the fourth and fifth switches of the second branch, wherein a negative terminal of the second flying capacitor is connected between the diode and the second switch of the first branch and a positive terminal of the second flying capacitor is connected between the fifth and sixth switches of the second branch, and wherein a negative terminal of the third flying capacitor is connected between the second and the third switches of the first branch and a positive terminal of the third flying capacitor is connected between the sixth and seventh switches of the second branch.

* * * * *